United States Patent [19]

Sawmiller et al.

[11] 4,173,154
[45] Nov. 6, 1979

[54] BICYCLE DRIVE SPROCKET SYSTEM

[76] Inventors: Nile E. Sawmiller; Craig S. Sawmiller, both of 784 S. Metcalf St., both of Lima, Ohio 45804

[21] Appl. No.: 851,827

[22] Filed: Nov. 16, 1977

[51] Int. Cl.² .................. F16H 9/00; F16H 11/00
[52] U.S. Cl. .................. 74/217 B; 74/594.2; 280/252; 280/261
[58] Field of Search .......... 74/217 B, 549.2, 219; 280/210, 200, 261, 236, 252, 241

[56] References Cited

U.S. PATENT DOCUMENTS

| 641,980 | 1/1900 | Lower | 280/261 |
|---|---|---|---|
| 1,154,292 | 9/1915 | Cribbs | 280/261 |
| 1,205,382 | 11/1916 | Parda | 280/261 |
| 1,485,682 | 3/1924 | Liese | 280/261 |
| 1,535,714 | 4/1925 | Burke | 280/261 |
| 3,820,820 | 6/1974 | Kutz | 280/252 |
| 3,891,235 | 6/1975 | Shelly | 280/241 |
| 3,972,244 | 8/1976 | Bieser et al. | 74/217 B |
| 4,029,334 | 6/1977 | Trammel, Jr. | 280/261 |

*Primary Examiner*—Ronald C. Capossela

[57] ABSTRACT

The invention relates to an improved pedal drive mechanism for a bicycle. The mechanism provides a vertically oval pedal path which provides an improvement in the thrust imparted to the driving wheel during the downward movement of the pedal. These paths are defined by two sets of sprockets disposed in parallel planes connected by a set of double strand chains. This mechanism is connected to the drive wheel by a conventional sprocket-chain linkage.

7 Claims, 8 Drawing Figures

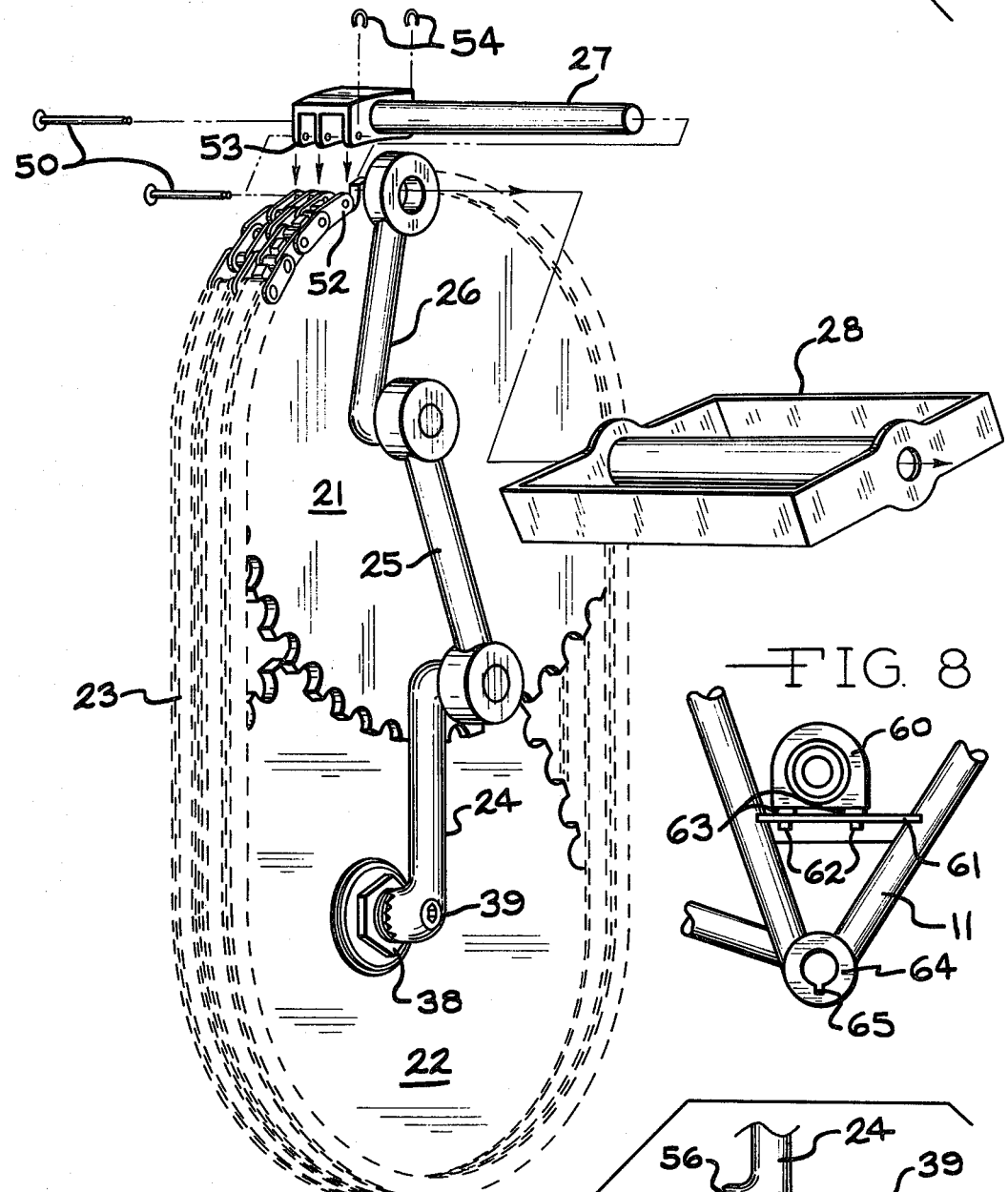
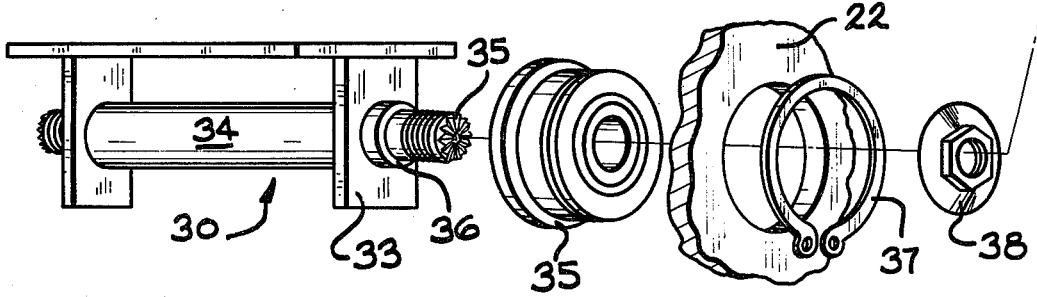

BICYCLE DRIVE SPROCKET SYSTEM

BACKGROUND OF THE INVENTION

In current single speed bicycle drive mechanisms, the rear wheel sprocket is driven by a chain coupled to a single forward mounted drive sprocket. This drive sprocket is in turn rotated by pedals revolving around a fixed axis to which the rider applies a circular motion. As a consequence of the motion being applied in circular fashion, the torque imparted to the drive sprocket varies with the relative position of the pedal. As the rider's foot passes over top dead center in an arc towards bottom dead center, the torque applied varies from zero to a maximum and back to zero again. Thus, maximum torque is achieved only at one instantaneous position in this cycle and, when the pedal is near the top or bottom of its power arc, it contributes little to the bicycle's driving force.

An attempt to overcome the problem associated with the circular paths of the pedals is illustrated in U.S. Pat. No. 3,891,235 where the pedals move in a vertical rectilinear path. One problem associated with this design, namely coincident application of the pedaling force with respect to the chain drive, necessitates a highly complicated guide mechanism to allow the required motion. Another problem is associated with the rachet-ing rear sprocket mechanism, specifically environmental considerations, in which dirt may adversely affect the operation of the complicated rachet means.

Another attempt to overcome the problems of conventional bicycle drives having a circular pedal path is shown in U.S. Pat. No. 3,820,820 where the pedals move in a generally oblong path with a substantially long downward or forward stroke. However, this construction features a substantial length of chain which must receive the pedal force without support from a sprocket and appears to be limited to the use of relatively small, widely spaced chain sprockets which will reduce the mechanical advantage applied to the wheel unless a separate intermediate drive sprocket is used. In addition, the design reduces ground clearance and increases overall width due the necessity for using oversize pedal stabilizers.

SUMMARY OF THE INVENTION

The present invention relates to a drive mechanism for a foot propelled vehicle. Specifically, the invention relates to the pedaling mechanism used on bicycles, pedal driven boats, and the like.

More particularly, in accordance with the present invention, there is provided a drive mechanism for bicycles which has two pair of chain sprockets, each pair disposed on opposite sides of the frame. Of the pair disposed on the same side of the frame, there exists one upper and one lower sprocket whose rotational axes are disposed in vertical alignment. This same pair of sprockets lies in closely adjacent, non-coincident planes and are connected together by a single, double strand chain. This chain defines the oblong, oval path in which the pedal rotates. This pedal, which is attached to the chain, is supported by a stabilization mechanism which has two moveable arms and one stationary arm.

This arrangement is repeated on the opposite side of the frame, wherein the placement of its pedal is in diametric opposition to the position of the opposite pedal. These two separate mechanisms are caused to operate simultaneously by the fixing of the two upper sprockets to a common rotational shaft.

Thus, when a downward force is imparted to one pedal and its mate is moving in a diametrically opposite direction, rotational motion is imparted to the sprockets, which in turn transfers the motion to the driven member of the vehicle thereby propelling it.

It is the primary object of this invention to increase the overall effectiveness of the pedaling mechanism by increasing the duration of the maximum thrust-producing segment of the pedaling cycle.

It is a further object of the invention to achieve a mechanical advantage by the utilization of large sprockets without the disadvantage associated with them, namely, a relatively large center-to-center distance.

It is another object of the invention to utilize a greater percentage of the thrust-producing force to propel the bicycle, by limitation of the length of the pedal stabilization members.

It is a further object of the invention to increase the maximum attainable pedaling speed by elimination of excess throw of the pedal stabilization members.

Other objects and advantages will be apparent to those skilled in the art from the following detailed description of the preferred embodiment, with reference being made to the accompanying drawings.

DESCRIPTION OF THE DRAWINGS

FIG. 3 is an enlarged, exploded, fragmentary perspective view of the idler gear assembly of the pedaling mechanism;

FIG. 4 is a partially exploded, perspective view of one side of the pedaling mechanism;

FIG. 8 is a fragmentary, side elevation of an alternate mounting arrangement of the pedaling mechanism upon the bicycle frame.

DESCRIPTION OF THE PREFERRED EMBODIMENTS

Figure 1:
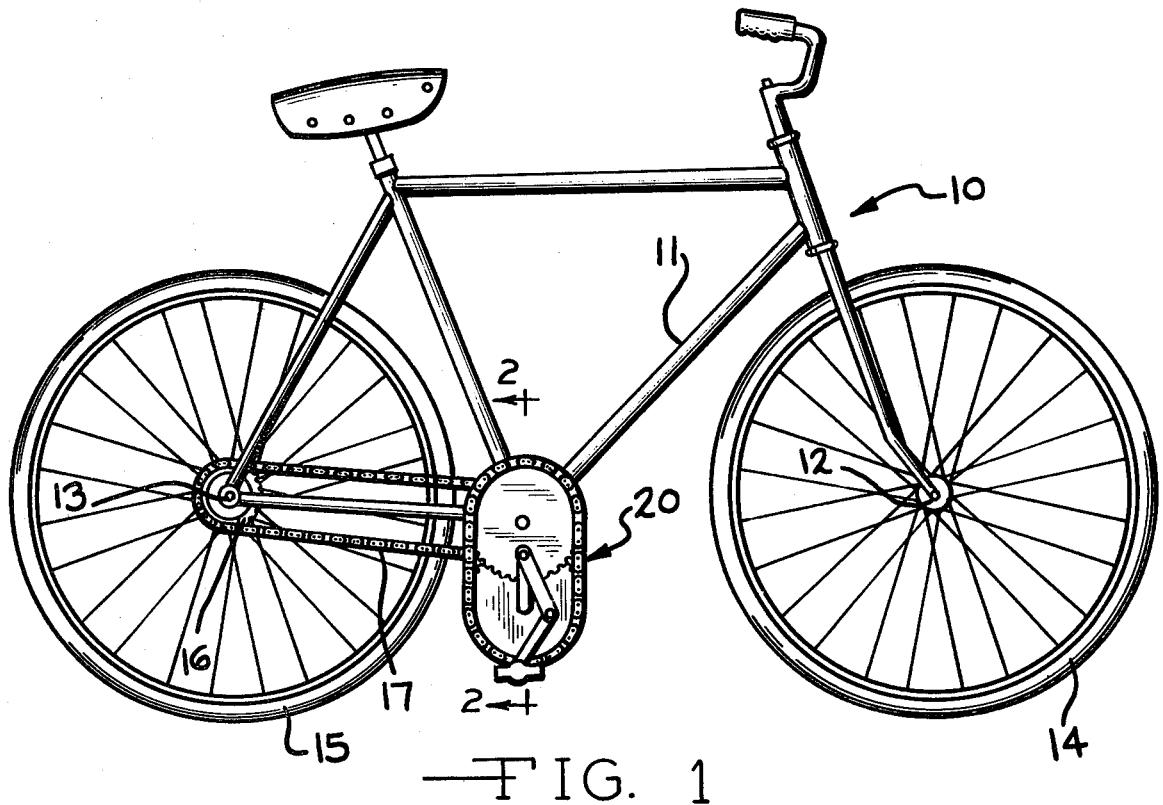
FIG. 1 is a side elevation of a bicycle which includes a preferred embodiment of the improved pedaling mechanism.

Referring to FIG. 1, a bicycle is generally indicated by the reference number 10. The bicycle 10, includes a frame 11, rotatably supporting the front and rear axles 12 and 13 of the front and rear wheels 14 and 15 respectively. The rear axle 15 has rigidly attached to it a sprocket 16, which is driven by chain 17 which is in turn driven by sprocket 18, (seen in FIG. 2). Rotational motion is imparted to the sprocket 18 by the pedaling mechanism, generally shown by reference number 20.

Figure 2:
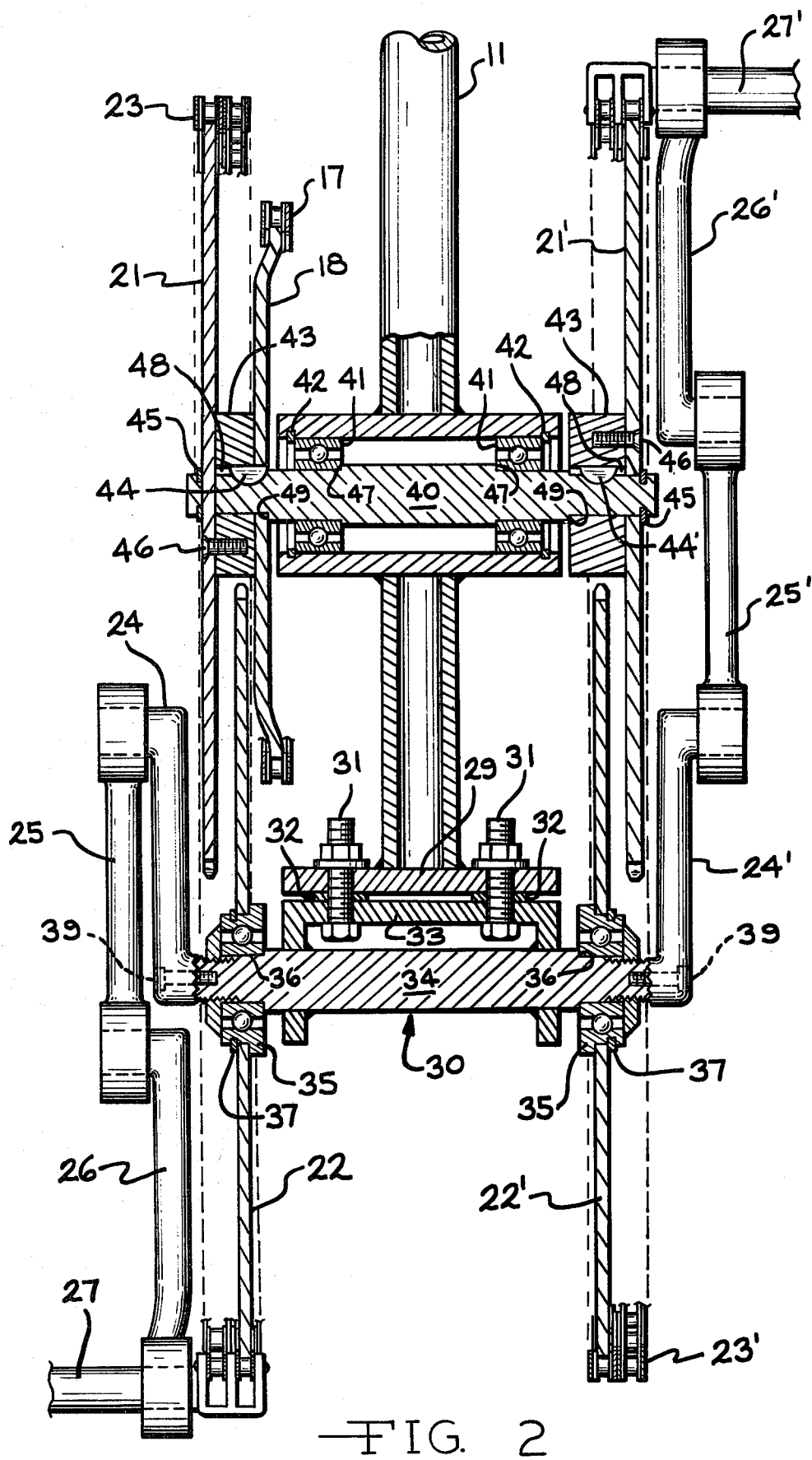
FIG. 2 is an enlarged, fragmentary, cross-sectional view of the pedaling mechanism taken along line 2—2 of FIG. 1.

Referring now to FIG. 2, the pedaling mechanism contains a pair of upper sprockets 21 and 21', a pair of lower sprockets 22 and 22' connected by a pair of double strand chains 23 and 23'. The sprockets 21 and 22 lie in parallel planes and each sprocket engages a separate strand of the double strand chain 23. The sprockets 21 and 21' are rotatably attached to the frame 11, through a shaft 40 supported for rotation by bearings 41. The shaft 40 is retained from lateral movement by the snap rings 42, holding the bearings 41 in place against shoulders 47 on the shaft.

The gear 21' is attached to a spacer 43 by a plurality of threaded fastners 46. The aforementioned assembly is retained on the shaft 40 by snap rings 45 positioning it against a shoulder 49. This assembly is restrained from motion relative to the shaft 40 by means of a Woodruff type key 44' inserted in a keyway 48 of the shaft 40.

The gear 21 is retained in similar fashion, but furthermore, the sprocket 18 is positioned between the spacer 43 and the shoulder 49 and retained from motion relative to the shaft 40 by the common key 44 of similar design to key 44'.

The idler gear assembly, generally indicated by the reference number 30 in FIG. 2, is attached to the frame flange 29 by means such as threaded fasteners 31. The shims 32, inserted between the frame flange 29 and the idler gear assembly 30, are for the purpose of adjusting the tension in the chains 23 and 23'.

Referring now to FIG. 2, the idler gear assembly 30 consists of an inverted channel shaped mounting bracket 33, to which a shaft 34 is transversely positioned between the two side portions of the channel and rigidly affixed thereto. The gear 22 is positioned on a bearing 35 and retained thereto by snap ring 37. This assembly is positioned against the shoulder 36 of the shaft 34, and retained thereon by a self-locking flanged nut 38.

Referring now to FIG. 3 and FIG. 4, the stationary lower arm 24 is rigidly affixed to the end of the shaft 34, by means such as a threaded fastener 39. Relative rotation is prohibited by the use of means such as serrations 55 on the end of the shaft 34, mating with similar serrations 56 on the lower end of the stationary arm 34. Attached for relative rotation to the stationary arm 24 is an intermediate arm 25. Attached to the opposite end of the intermediate arm 25, also attached in a manner allowing relative rotation is a follower arm 26. The opposite end of the follower arm 26 is positioned over the shaft portion of a chain puller 27, in a fashion again allowing a relative rotation, between the upper end of follower arm 26 and the shaft portion of the chain puller 27. Rotatably mounted mounted on the shaft portion of the chain puller 27 is a pedal 28 which is retained by any conventional method such as a snap ring or lock nut. The chain puller 27 is attached to the double strand chain 23 by replacing any one set of link plates and replacing the standard link pin with slightly longer pins 50, positioned through the holes in the link plates 52 and simultaneously through the holes 52 in the chain puller 27, and retained therein by the use of snap rings 54.

Figures 5, 6, 7:
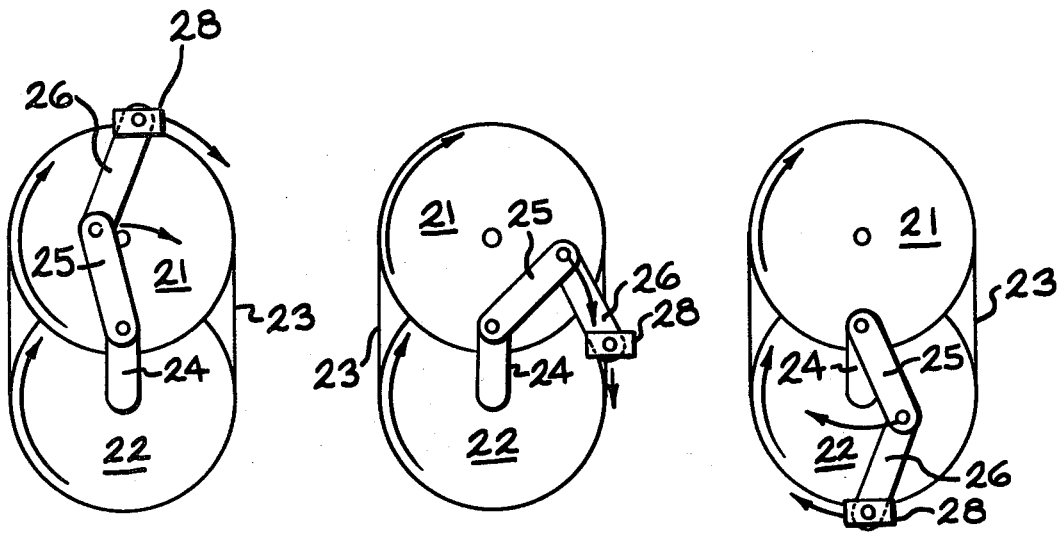
FIG. 5 is a diagrammatic side elevation of the pedaling mechanism illustrating the right pedal near the top of its path and commencing a downward power stroke. Also indicated is the relative direction of travel of the right hand members of the pedaling mechanism.
FIG. 6 is a diagrammatic side elevation of the pedaling mechanism similar to FIG. 5, but showing the pedal at approximately the midpoint of its downward power stroke.
FIG. 7 is a diagrammatic side elevation of the pedaling mechanism similar to FIG. 5, but showing the pedal near the bottom of its path and commencing on a return stroke.

The operation of the mechanism can be more readily understood with the aid of FIGS. 5, 6 and 7. As illustrated, the travel of the pedal follows the oval path of the chain around the periphery of the upper sprocket until that portion of the chain secured to the pedal departs from the upper sprocket. This path is continued from the point of tangency of the upper sprocket to the point of tangency with the lower sprocket, at which time if follows the periphery of the lower sprocket.

Since the pedals are connected to their respective chains in diametrically opposed position, as one pedal starts downwardly over top center, the opposite one starts upwardly from bottom center. During this cycle, the arms acting as a stabilization mechanism, resist the torsional moment created about the centroidal plane of the chain resulting from the application of the force at a point laterally disposed from the centroidal plane of the chain, as well as maintaining the pedal in a horizontal attitude.

The force imparted to the chain 23 is transferred to the upper sprockets 21 and 21', which are secured to the shaft 40. The drive sprocket 18 is also secured to the shaft 40 and transfers this force imparted to it from the sprockets 21 and 21' to the chain 17. The chain 17 transfers the force to the driven sprocket 16, driving the rear wheel 15.

Referring now to FIG. 8, another embodiment of the mounting for the pedaling assembly is shown. As shown in FIG. 8, the alternate embodiment for the mounting of the pedaling assembly consists of a pillow block type bearing assembly 60 mounted on a horizontal support member 61 and affixed to it by means such as threaded fastners 62. Shims 63 are inserted between the bearing assembly 60 and the horizontal support 61 for the purpose of tightening the chains 23 and 23'. This bearing 60 retains the upper shaft 40 for rotational movement as previously described. The idler gear assembly 30 is replaced by a hollow cylindrical member 64 which is an integral member of the lower portion of the frame 11. This cylindrical member 64 has a keyway 65 machined in it for the purpose of restraining the lower shaft 34 from rotation. The lower shaft 34 also has a keyway machined in it, and with the cooperation of a standard Woodruff type key, restrains the lower shaft from rotation. The remaining elements of the assembly 30 in this alternate embodiment may be as shown in FIG. 3.

As used and shown herein, the device is described in terms of a bicycle drive mechanism where the power stroke is in a downward direction, below the position of the riders hips and legs. Certain other types of recreation vehicles such as paddle boats can utilize the concepts of the invention in which the driver is positioned such that his power stroke includes a horizontal component. As used herein downward shall include such uses wherein the power stroke is downwardly relative to the poition of the driver.

From the foregoing description, it is obvious that the overall effectiveness of the pedaling mechanism is increased since a large portion of the downward travel of each pedal is vertical. This vertical motion imparts a constant maximum torque to the mechanism rather than the instantaneous maximum imparted in a standard drive system.

The advantage of large sprockets, specifically the ability to produce a large mechanical advantage without the disadvantage of a large center-to-center distance, is accomplished by the use of the double strand chain which allows the planes of the sprockets to be adjacent rather than coincident. This allows placement of the rotational axes of the sprockets at a distance less than one diameter apart.

The compact arrangement of the stabilization members allows a higher maximum pedaling speed since the total amount of energy spent in motivation of the system is reduced to a minimum. The small relative size of each member in the stabilization mechanism allows a greater portion of the applied force to be utilized for propulsion of the vehicle since inertia losses will be minimized.

In the above described mechanisms, variation of various connections may be necessary. Such adaptions or adjustments will be apparent to those skilled in the art. Other variations can be made without departing from the spirit and scope of the appended claims.

What we claim is:

1. A drive mechanism for a foot propelled vehicle comprising, in combination, an upper pair of chain sprockets rotatably journaled on an upper horizontal axis extending transverse of the vehicle frame, said upper pair of sprockets axially spaced from each other and secured together for rotation about said upper axis, a lower pair of chain sprockets rotatably journaled on a lower horizontal axis extending parallel to said upper axis, said lower pair of sprockets axially spaced from each other along said lower axis and lying in closely adjacent, parallel planes from the plane of said upper chain sprockets, a pair of double strand chains extending around and engaging with the peripheries of said upper and lower pairs of chain sprockets with one double chain interconnecting with one upper and one lower sprocket, and the other interconnecting with the other upper and lower sprocket, a pair of pedals secured to said chains in diametric opposition to each other and extending laterally outwardly therefrom to provide means for propelling said chains and sprockets in rotation about their axes, and a drive member secured for rotation with one of said upper or lower sprockets to provide a power take-off from said drive mechanism.

2. The drive mechanism described in claim 1, which further includes a pedal stabilizing mechanism comprising, in combination, a pair of stationary arms rigidly attached at one end to opposite ends of said lower horizontal axis, a pair of intermediate arms with one end rotatably supported from the other end of said stationary arms, a pair of follower arms rotatably attached to the other end of said intermediate arms and having their other ends rotatably attached to said pedals.

3. The drive mechanism described in claim 1, wherein said upper and lower pairs of sprockets are of a relatively large size and have overlapping peripheries.

4. The drive mechanism described in claim 1, wherein said drive member is a sprocket engaging a chain leading to a ground engaging driven member.

5. The drive mechanism described in claim 1, wherein said drive member and said upper sprocket are keyed to a common shaft for simultaneous rotation.

6. A drive mechanism for a bicycle, comprising, in combination, a pair of upper, horizontally spaced apart chain sprockets keyed to a common upper shaft which is rotatably supported by a frame member, a pair of lower, horizontally spaced apart chain sprockets laying in closely adjacent non-coincident planes with said upper chain sprockets, said lower sprockets each secured for independent relative rotation about a fixed lower shaft, a pair of double strand chains, each extending around and in engagement with the peripheries of one of said upper sprockets and one of said lower sprockets with one strand of said double strand chain engaging said upper sprocket and the remaining strand of said double strand chain engaging said lower sprocket.

a set of pedal stabilization mechanisms comprising a pair of stationary lower arms, each having one end fixed to each end of said fixed lower shaft, a pair of intermediate arms each having one end rotatably supported by the opposite end of said stationary arms, and a pair of follower arms each having one end rotatably attached to the opposite end of said intermediate arms, a set of pedals, each rotatably attached to the remaining ends of said follower arms and each connected also to a said double strand chain in diametric opposition to each other, and a drive sprocket secured to one of said sprockets for rotation with said sprocket, said drive sprocket imparting a force to a drive chain, said chain transferring said force to a driven sprocket for propulsion of the vehicle.

7. The drive mechanism described in claim 6, which further includes a mechanism for adjusting the relative separation between said upper shaft and said lower shaft.

* * * * *